July 19, 1932. L. OLSCHEWSKI 1,867,627
APPARATUS FOR TEACHING SWIMMING
Filed May 8, 1931   3 Sheets-Sheet 1
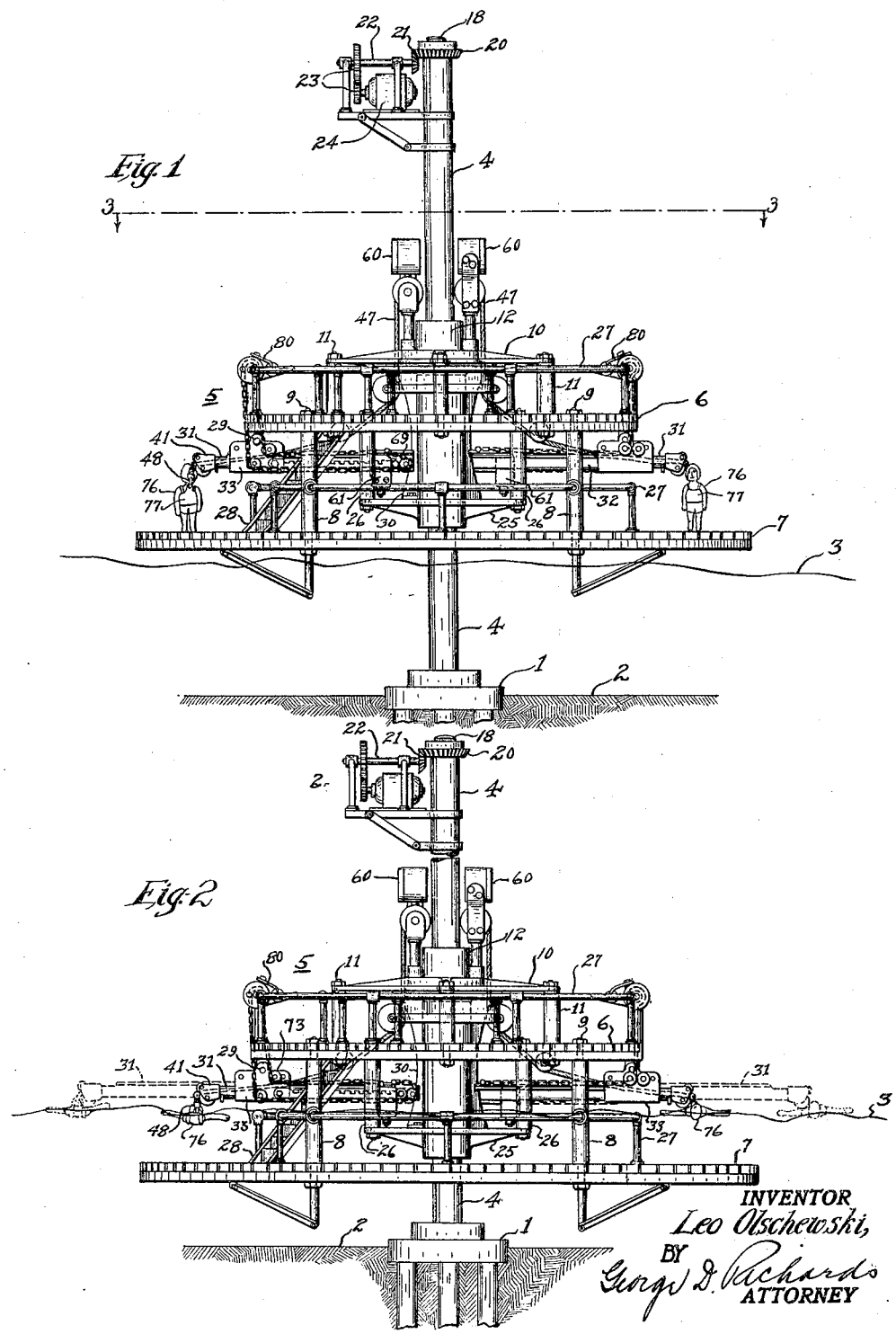

July 19, 1932.  L. OLSCHEWSKI  1,867,627
APPARATUS FOR TEACHING SWIMMING
Filed May 8, 1931   3 Sheets-Sheet 2
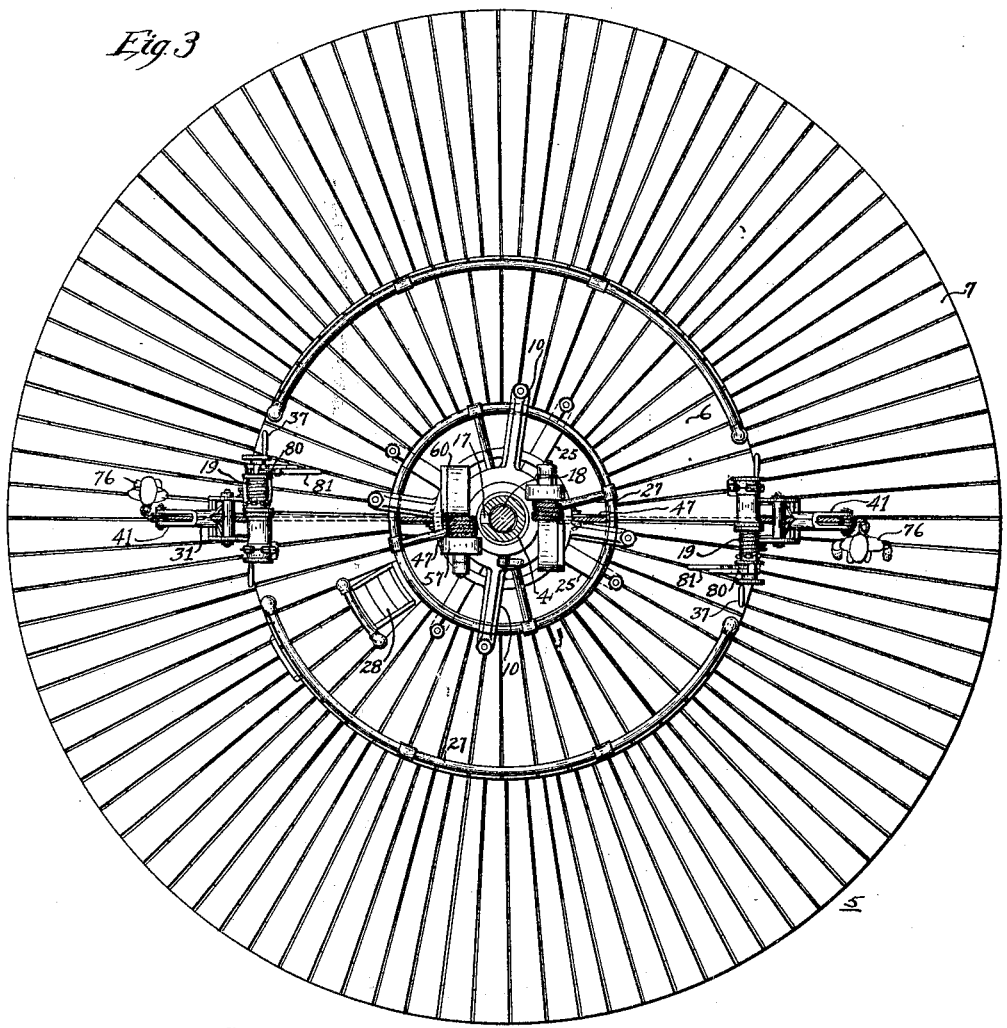
INVENTOR
Leo Olschewski,
BY
George D. Richards
ATTORNEY

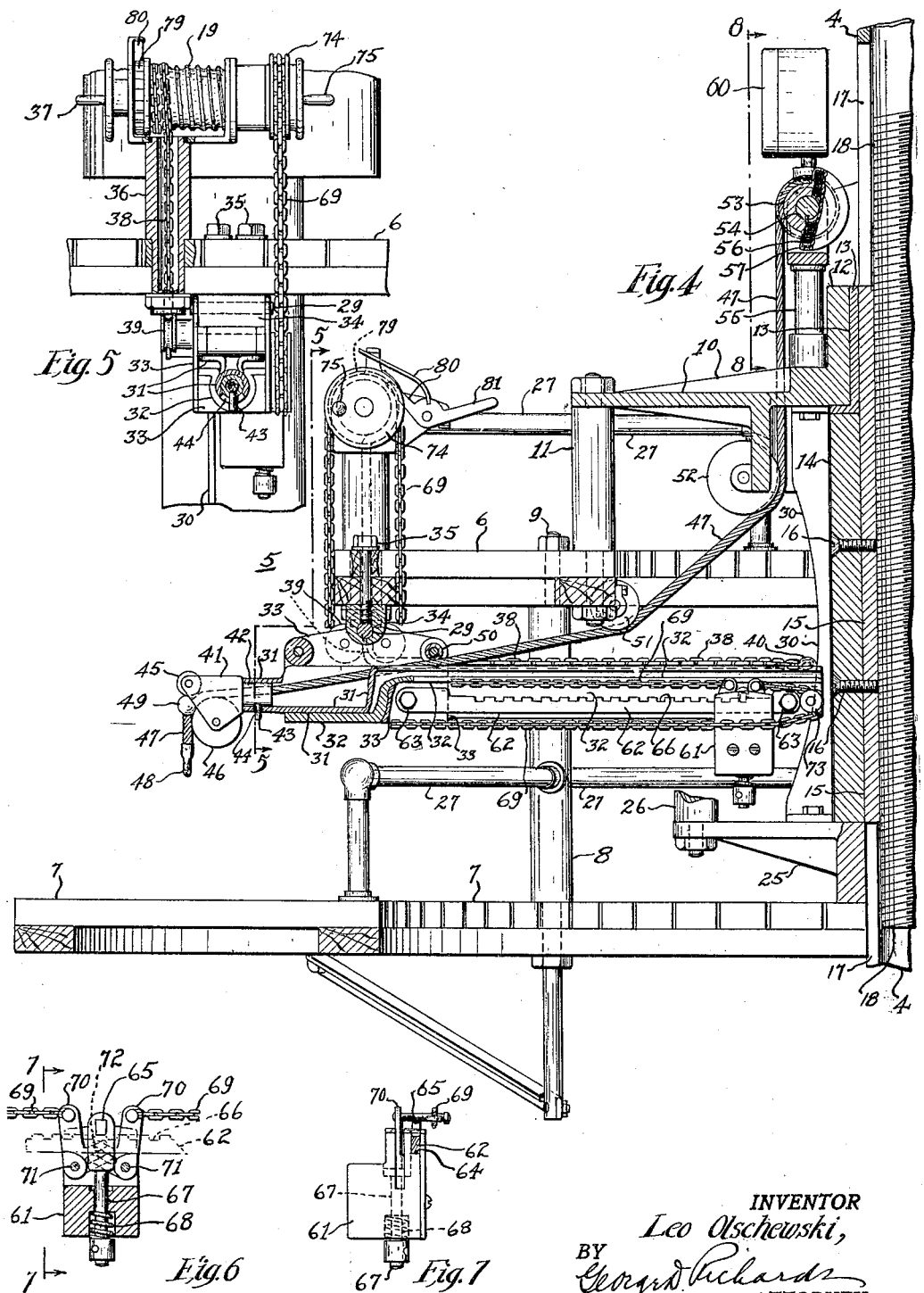

Patented July 19, 1932

1,867,627

UNITED STATES PATENT OFFICE

LEO OLSCHEWSKI, OF UNION, NEW JERSEY

APPARATUS FOR TEACHING SWIMMING

Application filed May 8, 1931. Serial No. 535,823.

This invention relates, generally, to apparatus used in giving swimming instruction; and the invention has reference, more particularly, to a novel apparatus for teaching swimming to one or more pupils simultaneously.

Heretofore, in teaching persons how to swim it has been generally necessary for the pupil to support or maintain himself in swimming position in the water from the very beginning of his course of instruction. Inasmuch as it requires considerable effort for a beginner to maintain himself afloat and as it is essential that the pupil should manipulate his limbs to ordinarily remain afloat, his attention is usually completely absorbed by this necessity so that he cannot readily learn the proper swimming strokes.

The principal object of the present invention is to provide a novel apparatus for teaching swimming, which apparatus is adapted to substantially or entirely support the learner's weight in the water when he begins his course of instruction so that he may thereby devote his attention to the proper swimming strokes, and as he progresses in his learning he is allowed to maintain more and more of his weight in the water, the said apparatus being so designed as to prevent accidental drowning of the learner.

Another object of the present invention lies in the provision of a novel apparatus for teaching swimming, which apparatus is adapted to be used in teaching a plurality of pupils simultaneously, and is so constructed and arranged as to enable a learner to advance in his course at a rate depending entirely upon his own ability, so that he is not held back by slow learners who are being simultaneously taught how to swim by means of the apparatus.

A third object of the present invention is to provide a novel apparatus for teaching swimming which is adapted to give a visual indication of the swimming ability of a learner and which is so constructed and arranged as to enable the swimmer to increase his swimming pace in proportion to his increased ability.

Other objects of this invention not at this time more particularly enumerated, will be clearly understood from the following detailed description of the same.

The invention is clearly illustrated in the accompanying drawings, in which:

Fig. 1 is a view in elevation illustrating the novel apparatus of the present invention, the said apparatus being shown in position preparatory to a period of instruction.

Fig. 2 is a view similar to Fig. 1 but illustrates the apparatus in operation during a period of construction.

Fig. 3 is a somewhat enlarged sectional view taken along line 3—3 of Fig. 1 and looking in the direction of the arrows.

Fig. 4 is an enlarged fragmentary view with parts broken away of a portion of the structure shown in Fig. 1.

Fig. 5 is a fragmentary view with parts broken away taken along line 5—5 of Fig. 4.

Fig. 6 is an enlarged, fragmentary view with parts broken away of a detail of construction.

Fig. 7 is a view taken along line 7—7 of Fig. 6; and

Fig. 8 is a fragmentary view taken along line 8—8 of Fig. 4.

Similar characters of reference are employed in all of the above described views, to indicate coresponding parts.

Referring now to said drawings wherein a preferred form of the invention is illustrated. the reference numeral 1 designates a base or pedestal which is adapted to be fixedly embedded in or mounted upon the bottom 2 of a lake, swimming pool or other body of water, having a water surface designated by the reference numeral 3.

A hollow column or post 4 extends vertically upward from the base 2 through the water and projects some distance above the water level 3. A rotatable carriage, designated as a whole by the reference numeral 5, surrounds column 4 and is adapted to be raised or lowered along this column in use. The rotatable carriage 5 comprises essentially two decks, an upper deck 6 and a lower deck 7. The lower deck 7 is suspended from the upper deck 6 by means of posts 8 which rigidly interconnect the two decks and are illustrated as consisting of interior bolts 9 that are surrounded by cylindrical deck spacing members or columns. The decks 6 and 7 are of annular shape in plan, the deck 6 being of lesser diameter than the deck 7. The upper deck 6 is suspended from a rotatable spider 10 by means of posts 11 which are illustrated as of the same construction as posts 8 and consist of interior bolts surrounded by cylindrical spacing members. The spider 10 has a hub 12 which is illustrated as turnably mounted on a bushing 13 (see especially Fig. 4) carried by a sleeve 14 surrounding the column 4. The sleeve 14 is vertically movable along column 4 and has a vertical key 15 secured thereto as by screws 16, which key projects into a vertical guide slot 17 provided in the column 4. The inner surface of key 15 is threaded to cooperate with a threaded rod 18 contained within the hollow column 4.

Rod 18 extends upwardly within column 4 and outwardly through an aperture in the top of this column. A bevel gear 20 is secured to the upper end of rod 18 and meshes with a similar gear 21 fixed to a shaft 22, which shaft is driven by gearing 23 from an electric motor 24. When electric motor 24 is operated, the threaded rod 18 is revolved, thereby causing the threaded key 15 to move up and down within slot 17, and effecting up and down movement of sleeve 14 and carriage 5 along column 4.

A spider 25 is positioned adjacent the lower end of sleeve 14 and has an axial bearing through which the column 4 extends. Posts 26 which are similar in form to posts 11 are connected at their lower ends to the spider 25 and at their upper ends to the upper deck 6. Spider 25 cooperates with spider 10 in rigidly mounting carriage 5 upon the column 4, while at the same time permitting rotation of this cariage about the column together with vertical movement of the carriage with respect to the column. The upper and lower decks are illustrated as equipped with suitable hand railings 27 and a stairway 28 leads from the lower deck 7 to the upper deck 6.

A plurality of similar derrick devices are adapted to be suspended from the upper deck 6. Only two of these devices are illustrated in the drawings for the sake of simplicity, although the apparatus would ordinarily be equipped with a greater number of the same. As these derrick devices are all similar only one of them will be described in detail. Each derrick device consists of a beam 31 which is slidably supported for telescoping movement within a guide frame 32, which guide frame has its outer end portion secured within a hanger 33 that is pivotally supported by a pin 29 upon a block 34 secured to deck 6 as by means of bolts 25. The hanger 33 enables the guide frame 32 and hence the beam 31 to be turned or titled up or down somewhat. A vertical guide web 30 is positioned adjacent the sleeve 14 and engages in a slot in the inner end of guide frame 32 for guiding this frame in its tilting or swivel motion about pin 29. This guide web has its upper and lower ends secured respectively to the spiders 10 and 25.

As the guide frame 32 and hanger 33 is tilted about the hinge pin 29, the outer end of beam 31 is raised or lowered as will be apparent. In order to move the beam 31 outwardly of guide frame 32, a drum 19 is provided above the deck 6 and is supported upon this deck as by means of a standard 36. A hand wheel 37 is provided on an extension of drum 19, which hand wheel when turned, is adapted to wind a chain 38 upon or off of the drum 19. The chain 38 extends downwardly and between guide rollers 39 carried by hanger 33 and then radially inward of the carriage 5 and has its inner end attached at 40 to the inner end of beam 31. Thus, when chain 38 is wound upon drum 19 by means of hand wheel 37, the chain acts to pull or move beam 31 outwardly of its supporting guide frame 32. In Fig. 2, the beam is shown in dotted lines in an outer position. Beam 31 is always urged radially inward of its supporting guide frame 32 by the pull of a cable or rope 47 which will be further described. To prevent undesired inward movement of the beam 31, the drum 19 is provided with a ratchet wheel 79 which cooperates with a spring pressed pawl 80. Pawl 80 by engaging the teeth of ratchet wheel 79 prevents the unwinding of chain 38 from drum 19 and hence prevents inward telescoping movement of the beam 31. Pawl 80 is provided with a handle 81 which, when manually depressed, will cause this pawl to disengage ratchet wheel 79 and thereby permit rope 47 to retract beam 31.

The beam 31 carries a swivel pulley block 41 at its outer end. Pulley block 41 has a hollow cylindrical shank 42 extending into a conforming recess provided in the end portion of beam 31. A pin 43, secured to shank 42 and working in an arcuate slot 44 provided in the outer end portion of beam 31, acts to limit the swivel movement of pulley block 41. Pulley block 41 carries grooved pulleys 45 and 46. The cable or rope 47 is adapted to run between pulleys 45 and 46. Rope 47 has a hook 48 attached to its free end and a stop such as a rigid ball 49 is secured upon this rope adjacent the hook 48 to prevent the hook from passing inwardly between the pulleys 45 and 46 under the tension of rope 47. From these pulleys, the rope 47 extends inwardly through the hollow shank 42, under a guide roller 50 carried by the hanger 33, under the guide rollers 51 and 52 carried by the upper deck and spider 10, respectively, to a spring tensioned drum 53 (see Figs. 4 and 8) mounted upon a shaft 54 which is carried by a pedestal 55 mounted on the spider 10.

The drum 53 is tensioned by a spiral spring 56 which has one end fixed to the stationary shaft 54 and its other end fixed to an enlarged extension 57 of drum 53. Spring 56 tends to turn drum 53 so that rope 47 is wound up upon this drum. The tension of this spring therefore normally presses the stop ball 49 on the free end portion of rope 47 into engagement with pulleys 45 and 46, thereby urging these pulleys and hence beam 31 inwardly to telescoped position within the guide frame 32 as shown in Fig. 4. A gear 58 is secured to the end of drum 53 and meshes with another gear 59 which in turn operates a registering device 60 also carried by the pedestal 55. In use, a swimmer is attached by a suitable belt to the hook 48 and as he swims he will tend to pull the rope 47 outwardly so that the same tends to unwind from the drum 53, thereby winding up the spring 57 and operating the registering device 60 which gives a visual indication of the pull exerted by the swimmer upon the rope 47.

In order to counterbalance the weight of the swimmer attached to the hook 48 of rope 47 at the outer end of beam 31, a counterweight 61 is adjustably mounted for longitudinal movement along the side of the guide frame 32. The weight of counterweight 61 is carried by a rack 62 which has its inner and outer ends, respectively, secured by bolts 63 to the guide frame 32 and the hanger 33. The counterweight 61 is provided with an aperture 64 (see especially Fig. 7) within which the rack 62 is slidably positioned. A lock pawl 65 operates within a vertical aperture provided in the counterweight 61 and is adapted to engage in tooth recesses 66 of the rack 62, thereby locking the counterweight 61 in any adjusted position along the rack 62.

Lock pawl 65 is carried by a plunger 67 which is urged downwardly by a coil spring 68 contained within the counterweight. Spring 68 tends to urge the lock pawl 65 downwardly and into engagement with the tooth recesses 66 at all times. The counterweight 61 is moved along the rack 62 by means of a chain 69. Chain 69 has its ends attached to bell crank levers 70 which are pivoted on pins 71 carried by the counterweight 61. Bell crank levers 70 have slotted inner arms which mutually cooperate with a pin 72 projecting from the plunger 67. Chain 69 extends around idlers 73 and up and over a sprocket 74 carried by the standard 36. Sprocket 74 is adapted to be operated by a hand wheel 75.

In use, as one starts to turn hand wheel 75 he initially places a tension in chain 69 which acts to pull bell crank levers 70 away from each other or outwardly as shown in Fig. 6, thereby effecting the raising of plunger 67 and the removal of lock pawl 65 from engagement with a tooth recess of rack 62. Continued movement of hand wheel 75 will then cause counterweight 61 to slide along the rack 62 with the pawl 65 disengaged therefrom. When the hand wheel 75 is again released, the spring 68 acts to immediately retract the pawl 65 so that it moves into one of the tooth recesses 66, thereby locking the counterweight 61 in adjusted position.

In operating the apparatus of the present invention, the swimming instructor stands on deck 6 and the pupils stand on deck 7 as illustrated in Fig. 1. These pupils 76 (see Fig. 1) are attached respectively, by suitable belts 77 to the hooks 48 of the respective derrick devices of which there would ordinarily be a plurality extending outwardly in all directions from the center of the rotatable carriage 5. After the pupils have been attached to the hooks 48 as illustrated in Fig. 1, the instructor initiates the operation of motor 24 as by pressing a suitable switch button (not shown). Motor 24 then operates to turn threaded rod 18 to effect the lowering of carriage 5 so that the lower deck 7 carried by the carriage, moves under water as shown in Fig. 2, in which position the pupils 76 may readily float upon the surface of water 3 while at the same time they are supported by the tension of rope 47, the same being tensioned by the spring drums 53. The pupils 76 all arrange themselves so as to swim in the same direction, thereby effecting the revolving of the carriage 5 about the column 4. The pull that a pupil exerts upon his respective rope 47 is registered by his registering device 60, thereby giving a visible showing of his swimming ability.

The counterweights 61 are adjusted in the case of each pupil so as to counterbalance his weight so that he is held in the right position with respect to the water surface. The instructor can adjust the counterweights 61 at any time during the swimming lesson. As a pupil becomes more skillful, he will desire to swim greater distances and consequently the instructor will then operate handle 37 so as to move the respective pupil's beam 31 outwardly as shown in dotted lines in Fig. 2, so that the circle over which the pupil swims is larger than before. The weight of the pupil, however, may be properly counterbalanced as before either, in whole or in part, by adjusting the counterweight 61 along the rack 62.

Thus it will be noted that various pupils in various stages or development or progress in the art of swimming may take lessons simultaneously; the more advanced students swimming longer arcs or circles than the newer students who keep close to the carriage 5. Owing to the positive supporting of the student weight, he is prevented from drowning at all times. After a student has become proficient and can maintain himself in the water, the counterbalance weight 61 is adjusted so as to just support the weight of beam 31 and its associated parts.

As many changes could be made in the above construction and many apparently widely different embodiments of this invention could be made without departing from the scope thereof, it is intended that all matter contained in the above description or shown in the accompanying drawings shall be interpreted as illustrated and not in a limiting sense.

What is claimed is:

1. An apparatus for teaching swimming comprising, a rotatable carriage, means for supporting said carriage for rotation with respect to a body of water, a derrick device carried by said carriage and adapted to support a person in the water so that the person may swim in circles as the carriage revolves, said derrick device being radially extensible, whereby the person may swim in circles of varying diameters.

2. An apparatus for teaching swimming comprising, a rotatable carriage, means for supporting said carriage for rotation with respect to a body of water, a derrick device carried by said carriage and adapted to support a person in the water so that the person may swim in circles as the carriage revolves, said derrick device being radially extensible, whereby the person may swim in circles of varying diameters, and indicator means associated with said derrick device for visually indicating the pull exerted by the person during swimming.

3. An apparatus for teaching swimming comprising, a rotatable carriage arranged to be rotated with respect to a body of water, said carriage having a deck, means for supporting said carriage whereby said deck may be raised above or lowered below the water surface of the body of water, motor means for raising and lowering said carriage, said carriage having a derrick device thereon for supporting a person in the water so that such person may swim in circles as the carriage revolves.

4. An apparatus for teaching swimming comprising, a rotatable carriage arranged to be rotated with respect to a body of water, means for supporting said carriage whereby the latter may be raised and lowered with respect to the water surface of the body of water, motor means for raising and lowering said carriage, said carriage having a derrick device thereon for supporting a person in the water so that such person may swim in circles as the carriage revolves, said derrick device being extensible, manually operable means for extending said derrick device, whereby the person may swim in larger circles, and automatic means for retracting said derrick device.

5. An apparatus for teaching swimming comprising, a rotatable carriage having a pupil's deck, means for supporting said carriage for rotation with respect to a body of water, a derrick device supported above said pupil's deck and adapted to have a person attached thereto while such person is standing on said pupil's deck, means for lowering said carriage whereby said pupil's deck is submerged, causing the person connected to the derrick device to float in the water, said derrick device being adapted to support the person in the water, whereby such person may swim in circles as the carriage revolves.

6. An apparatus for teaching swimming comprising, a rotatable carriage having a pupil's deck, means for supporting said carriage for rotation with respect to a body of water, a derrick device supported above said pupil's deck and adapted to have a person attached thereto while such person is standing on said pupil's deck, means for lowering said carriage whereby said pupil's deck is submerged, causing the person connected to the derrick device to float in the water, said derrick device being adapted to support the person in the water, whereby such person may swim in circles as the carriage revolves, means for extending or retracting said derrick device, whereby the person connected thereto may swim in circles of varying diameters, and means associated with said derrick device for giving a visual indication of the pull of said person thereon.

7. An apparatus for teaching swimming comprising, a rotatable carriage having a pupil's deck and an instructor's deck positioned above said pupil's deck, means for supporting said carriage for rotation with respect to a body of water, means for raising or lowering said carriage whereby said pupil's deck may be submerged, a derrick device suspended from said instructor's deck, said derrick device comprising telescopic members, one of said telescopic members being adapted to support a person in the water from the outer end thereof, whereby said person may swim in circles as said carriage revolves.

8. An apparatus for teaching swimming comprising, a rotatable carriage having a pupil's deck and an instructor's deck positioned above said pupil's deck, means for supporting said carriage for rotation with respect to a body of water, means for raising or lowering said carriage whereby said pupil's deck may be submerged, a derrick device suspended from said instructor's deck, said derrick device comprising telescopic members, one of said telescopic members being adapted to support a person in the water from the outer end thereof, a counterweight carried by the other telescopic member and adjustable therealong for counterbalancing the weight of the supported person, and means for telescoping said telescopic members, whereby the person may swim in circles of varying diameters as said carriage revolves.

9. An apparatus for teaching swimming comprising, a rotatable carriage having a pupil's deck and an instructor's deck positioned above said pupil's deck, means for supporting said carriage for rotation with respect to a body of water, means for raising or lowering said carriage whereby said pupil's deck may be submerged, a derrick device suspended from said instructor's deck, said derrick device comprising telescopic members, one of said telescopic members being adapted to support a person in the water from the outer end thereof, a counterweight carried by the other telescopic member and adjustable therealong for counterbalancing the weight of the supported person, manually operable means for extending said telescopic members and spring means acting to contract said telescopic members upon the release of said manually operable means.

10. An apparatus for teaching swimming comprising, a hollow vertical supporting column, sleeve means movable vertically along said column, a rotatable carriage having an upper instructor's deck and a lower and larger pupil's deck, said carriage being rotatably mounted upon said sleeve means, motor means for moving said sleeve means up and down said column whereby said lower deck may be lowered into or raised out of the water, a plurality of radially extending derrick devices, hangers pivotally suspended from said upper deck and supporting said derrick devices whereby the latter may be swiveled about the pivotal supports of said hangers, each of said derrick devices comprising a guide frame secured at its outer portion to its respective hanger, and a beam telescopically mounted on said guide frame, said beam being adapted to support a person in the water and to enable the person to swim in circles as said carriage revolves.

11. An apparatus for teaching swimming comprising, a hollow vertical supporting column, sleeve means movable vertically along said column, a rotatable carriage having an upper instructor's deck and a lower and larger pupil's deck, said carriage being rotatably mounted upon said sleeve means, motor means for moving said sleeve means up and down said column whereby said lower deck may be lowered into or raised out of the water, a plurality of radially extending derrick devices, hangers pivotally suspended from said upper deck and supporting said derrick devices whereby the latter may be swiveled about the pivotal supports of said hangers, each of said derrick devices comprising a guide frame secured at its outer portion to its respective hanger, a beam telescopically mounted on said guide frame, a pulley block carried by the outer end of said beam, a spring tensioned drum, a cable wound upon said drum and extending through said pulley block, a hook secured to the free end of said cable, a projection on said cable adjacent said hook and engaging said pulley block to cause said cable to urge said beam inwardly of said guide frame, and manually operable means for moving said beam outwardly of said guide frame.

12. An apparatus for teaching swimming comprising, a hollow vertical supporting column, sleeve means movable vertically along said column, a rotatable carriage having an upper instructor's deck and a lower and larger pupil's deck, said carriage being rotatably mounted upon said sleeve means, motor means for moving said sleeve means up and down said column whereby said lower deck may be lowered into or raised out of the water, a plurality of radially extending derrick devices, hangers pivotally suspended from said upper deck and supporting said derrick devices whereby the latter may be swiveled about the pivotal supports of said hangers, each of said derrick devices comprising a guide frame secured at its outer portion to its respective hanger, a beam telescopically mounted on said guide frame, a pulley block carried by the outer end of said beam, a spring tensioned drum, a cable wound upon said drum and extending through said pulley block, a hook secured to the free end of said cable, a projection on said cable adjacent said hook and engaging said pulley block to cause said cable to urge said beam inwardly of said guide frame, manually operable means for moving said beam outwardly of said guide frame, means for releasably locking said beam in any outer position and a counterweight adjustably mounted on said guide frame.

13. An apparatus for teaching swimming comprising, a hollow vertical supporting column, sleeve means movable vertically along said column, a rotatable carriage having an upper instructor's deck and a lower and larger pupil's deck, said carriage being rotatably mounted upon said sleeve means, motor means for moving said sleeve means up and down said column whereby said lower deck may be lowered into or raised out of the water, a plurality of radially extending derrick devices, hangers pivotally suspended from said upper deck and supporting said derrick devices whereby the latter may be swiveled about the pivotal supports of said hangers, each of said derrick devices comprising a guide frame secured at its outer portion to its respective hanger, a beam telescopically mounted on said guide frame, a pulley block carried by the outer end of said beam, a spring tensioned drum, a cable wound upon said drum and extending through said pulley block, a hook secured to the free end of said cable, a projection on said cable adjacent said hook and engaging said pulley block to cause said cable to urge said beam inwardly of said guide frame, means manually operable from said instructor's deck for moving said beam outwardly of said guide frame, ratchet and pawl means also controlled from said instructor's deck for releasably locking said beam in an outer position, a counterweight carried by said guide frame, and transmission means operable from said instructor's deck for moving said counterweight along said guide frame.

In testimony, that I claim the invention set forth above I have hereunto set my hand this 2nd day of May, 1931.

LEO OLSCHEWSKI.